US010986561B2

(12) United States Patent
Parikh et al.

(10) Patent No.: US 10,986,561 B2
(45) Date of Patent: Apr. 20, 2021

(54) WIRELESS LOCAL AREA NETWORK (WLAN) DENSITY CONTROL

(71) Applicant: QUALCOMM Incorporated, San Diego, CA (US)

(72) Inventors: Hemish Parikh, San Diego, CA (US); Tevfik Yucek, San Jose, CA (US); Michael Richard Green, Needham, MA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 16/135,830

(22) Filed: Sep. 19, 2018

(65) Prior Publication Data
US 2019/0124584 A1 Apr. 25, 2019

Related U.S. Application Data

(60) Provisional application No. 62/575,740, filed on Oct. 23, 2017.

(51) Int. Cl.
*H04W 48/06* (2009.01)
*H04W 72/04* (2009.01)
(Continued)

(52) U.S. Cl.
CPC ........... *H04W 48/06* (2013.01); *H04W 16/14* (2013.01); *H04W 24/10* (2013.01);
(Continued)

(58) Field of Classification Search
CPC ..... H04W 4/029; H04W 16/14; H04W 24/02; H04W 24/10; H04W 36/20;
(Continued)

(56) References Cited

U.S. PATENT DOCUMENTS 9,565,610 B2 * 2/2017 Ibrahim ................ H04W 36/30
9,743,287 B2 * 8/2017 Scheim ................ H04W 48/16
(Continued)

OTHER PUBLICATIONS

"PCT Application No. PCT/US2018/052042 International Search Report and Written Opinion", dated Mar. 4, 2019, 19 pages.
(Continued)

*Primary Examiner* — Marsha D Banks Harold
*Assistant Examiner* — Dharmesh J Patel
(74) *Attorney, Agent, or Firm* — Qualcomm Inc (DL)

(57) ABSTRACT

This disclosure provides systems, methods, and apparatus, including computer programs encoded on computer-readable media, for managing wireless local area network (WLAN) density. The WLAN density is managed to limit how many APs can utilize a first portion of a first frequency band in a geographical area. A limit of APs may be based on an estimated amount of interference that would be caused by the APs to an incumbent system that also uses the first portion of the frequency band. The WLAN density control may prevent the estimated amount of interference caused by APs in a geographical area from exceeding a threshold interference level based on the presence of the incumbent system. WLAN density control may involve the AP configuration of a first AP or may involve the density of client devices associated with one or more APs in the geographical area.

13 Claims, 12 Drawing Sheets

(51) Int. Cl.
*H04W 24/10* (2009.01)
*H04W 72/08* (2009.01)
*H04W 76/18* (2018.01)
*H04W 16/14* (2009.01)
*H04W 84/12* (2009.01)
*H04W 48/16* (2009.01)
*H04W 36/20* (2009.01)

(52) U.S. Cl.
CPC ..... *H04W 72/0453* (2013.01); *H04W 72/082* (2013.01); *H04W 76/18* (2018.02); *H04W 36/20* (2013.01); *H04W 48/16* (2013.01); *H04W 84/12* (2013.01)

(58) Field of Classification Search
CPC ... H04W 36/135; H04W 48/06; H04W 48/16; H04W 52/30; H04W 52/243; H04W 52/244; H04W 64/006; H04W 72/082; H04W 72/0453; H04W 76/18; H04W 84/12; H04W 84/18; H04W 84/045; H04L 41/08; H04L 48/06; H04B 1/1027
See application file for complete search history.

(56) References Cited

U.S. PATENT DOCUMENTS

| | | | |
|---|---|---|---|
| 10,172,014 B2* | 1/2019 | Egner | H04W 24/02 |
| 2004/0166852 A1* | 8/2004 | Backers | H04W 72/0486 |
| | | | 455/434 |
| 2016/0174233 A1 | 6/2016 | Emmanuel et al. | |
| 2016/0309345 A1* | 10/2016 | Tehrani | H04W 72/0426 |

OTHER PUBLICATIONS

Ashok, "Impact of Wi-Fi deployments and imperfect knowledge of Radar systems on Radar Wi-Fi coexistence", Jan. 1, 2017, 77 pages.
ITU, "Annex 29 to Working Party 5A Chairman's Report—Working Document Towards a Preliminary Draft New Report ITU-R M.[RLAN Sharing]—Sharing and compatibility studies of WAS/RLAN in the 5 GHz frequency range", Jun. 12, 2017, 169 pages.

* cited by examiner

500

510 — DETERMINE, BY THE FIRST AP, A LIMIT OF APs THAT CAN UTILIZE AT LEAST A FIRST PORTION OF A FIRST FREQUENCY BAND IN A GEOGRAPHICAL AREA BASED, AT LEAST IN PART, ON AN ESTIMATED AMOUNT OF INTERFERENCE THAT WOULD BE CAUSED BY THE APs TO AN INCUMBENT SYSTEM

520 — DETERMINE, BY THE FIRST AP, A QUANTITY OF EXISTING APs IN THE GEOGRAPHICAL AREA THAT ARE CURRENTLY UTILIZING AT LEAST THE FIRST PORTION OF THE FIRST FREQUENCY BAND

530 — MANAGE, BY THE FIRST AP, A CONFIGURATION OF THE FIRST AP BASED, AT LEAST IN PART, ON A COMPARISON OF THE QUANTITY OF EXISTING APs AND THE LIMIT

FIG. 5

EXAMPLE TECHNIQUES FOR REDUCING WLAN DENSITY IN A GEOGRAPHICAL AREA

700

710 — DETERMINE TO REDUCE WLAN DENSITY IN A GEOGRAPHICAL AREA

720 — REFRAIN FROM ESTABLISHING THE FIRST AP COVERAGE AREA UTILIZING THE FIRST PORTION OF THE FIRST FREQUENCY BAND

730 — CONFIGURE THE FIRST AP COVERAGE AREA TO UTILIZE A SECOND PORTION OF THE FIRST FREQUENCY BAND THAT IS DIFFERENT FROM THE FIRST PORTION

740 — CONFIGURE THE FIRST AP COVERAGE AREA TO UTILIZE A SECOND FREQUENCY BAND THAT IS DIFFERENT FROM THE FIRST FREQUENCY BAND

750 — REDUCE THE QUANTITY OF EXISTING APs THAT ARE UTILIZING THE FIRST PORTION OF THE FIRST FREQUENCY BAND BY CAUSING A SECOND AP TO MODIFY A SECOND AP COVERAGE AREA OF THE SECOND AP

FIG. 7

WIRELESS LOCAL AREA NETWORK (WLAN) DENSITY CONTROL

CROSS-REFERENCE TO RELATED APPLICATIONS

This patent application claims priority to U.S. Provisional Patent Application No. 62/575,740, filed Oct. 23, 2017, entitled "WIRELESS LOCAL AREA NETWORK (WLAN) DENSITY CONTROL," and assigned to the assignee hereof. The disclosure of the prior application is considered part of and is incorporated by reference in this patent application.

TECHNICAL FIELD

This disclosure relates to the field of network communication, and more particularly to managing wireless local area network (WLAN) density.

DESCRIPTION OF THE RELATED TECHNOLOGY

An access point (AP) of a wireless local area network (WLAN) can enable wireless network access for a client device. The AP may provide a wireless coverage area used by one or more client devices to access the WLAN via the AP. The wireless coverage area provided by an AP may utilize a portion of a frequency band (such as a 2.4 GHz frequency band, a 5 GHz frequency band, a 6 GHz frequency band, etc.). Within each frequency band, there may be different channels which an AP may utilize for the coverage area. Some APs are capable of selecting a frequency band and a channel within the frequency band. As more WLANs are deployed, there may be increasing quantities of APs used within the same geographical area.

New technologies are being developed which can utilize overlapping portions of a frequency band. For example, WLAN signals may occupy a frequency band that is also used by signals of an incumbent system (such as satellite, radar, terrestrial radio, or cellular signals, etc.). In some implementations, it may be desirable to prevent or mitigate interference to an incumbent system caused by a WLAN utilizing an overlapping portion of a frequency band in a same geographical area.

SUMMARY

The systems, methods, and devices of this disclosure each have several innovative aspects, no single one of which is solely responsible for the desirable attributes disclosed herein.

One innovative aspect of the subject matter described in this disclosure can be implemented by a first access point (AP) of a wireless local area network (WLAN). The first AP may determine a limit of APs that can utilize at least a first portion of a first frequency band in a geographical area. The limit may be based on an estimated amount of interference that would be caused by the APs to an incumbent system. The first AP may determine a quantity of existing APs in the geographical area that are currently utilizing at least the first portion of the first frequency band. The first AP may manage a configuration of the first AP based on a comparison of the quantity of existing APs and the limit.

In some implementations, the first AP may determine that a signal associated with the incumbent system has been detected in the geographical area. The first AP may set the limit based on a determination that the signal associated with the incumbent system has been detected in the geographical area.

In some implementations, the first AP may determine a threshold interference level. The first AP may determine estimated amounts of interference that would be caused by different quantities of APs to the incumbent system. The first AP may set the limit to a maximum quantity of APs having the estimated amount of interference lower than the threshold interference level.

In some implementations, the first AP may determine the limit by maintaining a history of previous amounts of interference for different quantities of APs utilizing the first portion of the first frequency band in the geographical area. The first AP may determine the limit based on the history of previous amounts of interference for different quantities of APs.

In some implementations, the first AP may determine the limit by obtaining an indication of the limit from at least one member selected from a group consisting of a configuration parameter of the first AP, a centralized server associated with the WLAN, a root AP in the geographical area, and an incumbent system detector.

In some implementations, the first AP may collect interference measurements from one or more client devices. The first AP may determine the limit based on the interference measurements from the one or more client devices.

In some implementations, the first AP may communicate a WLAN density control message to at least a second AP. The WLAN density control message may include at least one member selected from a group consisting of the limit determined by the first AP, interference measurements regarding at least the first portion of the first frequency band, identification of existing APs in the geographical area, and current amount of interference to the incumbent system caused by one or more existing APs in the geographical area.

In some implementations, the first AP may determine a current amount of interference to the incumbent system caused by the quantity of existing APs in the geographical area. The first AP may determine that the current amount of interference exceeds a cumulative interference level. The first AP may reduce a WLAN density in the geographical area in response to a determination that the current amount of interference exceeds the cumulative interference level.

In some implementations, the first AP may determine that the quantity of existing APs may be equal to or more than the limit. The first AP may reduce a WLAN density in the geographical area in response to determining that the quantity of existing APs may be equal to or more than the limit.

In some implementations, the first AP reducing the WLAN density in the geographical area may include the first AP refraining from establishing a first AP coverage area of the first AP in the first portion of the first frequency band, configuring the first AP coverage area to utilize a second portion of the first frequency band that may be different from the first portion, performing a channel reselection to a new channel that is different from the first portion of the first frequency band and establishing the first AP coverage area using the new channel, configuring the first AP coverage area to utilize a second frequency band that may be different from the first frequency band, and reducing the quantity of existing APs that are utilizing the first portion of the first frequency band by causing a second AP to modify a second AP coverage area of the second AP, or any combination thereof.

In some implementations, the first AP may receive a request from a first client device for a connection between the first client device and the first AP. The first AP may update the estimated amount of interference to the incumbent system based on a projected additional interference that would result from granting the request. The first AP may determine whether to grant or reject the request based, at least in part, on whether the estimated amount of interference to the incumbent system exceeds a threshold interference level.

In some implementations, the first portion may include a first channel defined within the first frequency band. The limit may be determined as a maximum quantity of APs that can utilize the first channel in the geographical area without disrupting the incumbent system.

In some implementations, the incumbent system may be a satellite system or a radar system associated with an incumbent signal in at least the first portion of the first frequency band.

In some implementations, the first AP may determine that the geographical area associated with the first AP matches at least part of a the satellite coverage area for the incumbent satellite signal of a satellite. The satellite coverage area may be based, at least in part, on a current geographical position of the satellite. The first AP may determine the limit to prevent the estimated amount of interference to the incumbent signal from exceeding a threshold interference level.

In some implementation, the first AP may determine the geographical area associated with the first AP. The first AP may determine that the incumbent system has a coverage area that overlaps at least part of the geographical area associated with the first AP.

In some implementations, the geographical area may be defined in relation to a location, an apartment building, an office building, a home, a business address, or a sports venue where there first AP is located.

In some implementations, the geographical area may be defined by a distance from a central location associated with the first AP.

In some implementations, a size of the geographical area may be set based on a range associated with a first AP coverage area of the first AP.

Another innovative aspect of the subject matter described in this disclosure can be implemented as a method performed by a first AP of a WLAN. The method may include determining, by the first AP, a limit of APs that can utilize at least a first portion of a first frequency band in a geographical area based on an estimated amount of interference that would be caused by the APs to an incumbent system. The method may include determining, by the first AP, a quantity of existing APs in the geographical area that are currently utilizing at least the first portion of the first frequency band. The method may include managing, by the first AP, a configuration of the first AP based on a comparison of the quantity of existing APs and the limit.

Another innovative aspect of the subject matter described in this disclosure can be implemented in a computer-readable medium having stored therein instructions which, when executed by a processor, cause the processor to perform the above-recited method or the above-described features of the first AP.

Another innovative aspect of the subject matter described in this disclosure can be implemented in an apparatus. The apparatus may include a processor and memory coupled with the processor. The memory may have instructions stored therein which, when executed by the processor cause the apparatus to perform the above-recited method or the above-described features of the first AP.

Another innovative aspect of the subject matter described in this disclosure can be implemented in a system. The system may include means for implementing the above-recited method or the above-described features of the first AP.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 depicts a flowchart of example techniques for managing WLAN density.

FIG. 7 depicts a flowchart of example techniques for reducing WLAN density.

Like reference numbers and designations in the various drawings indicate like elements.

DETAILED DESCRIPTION

Figure 1:
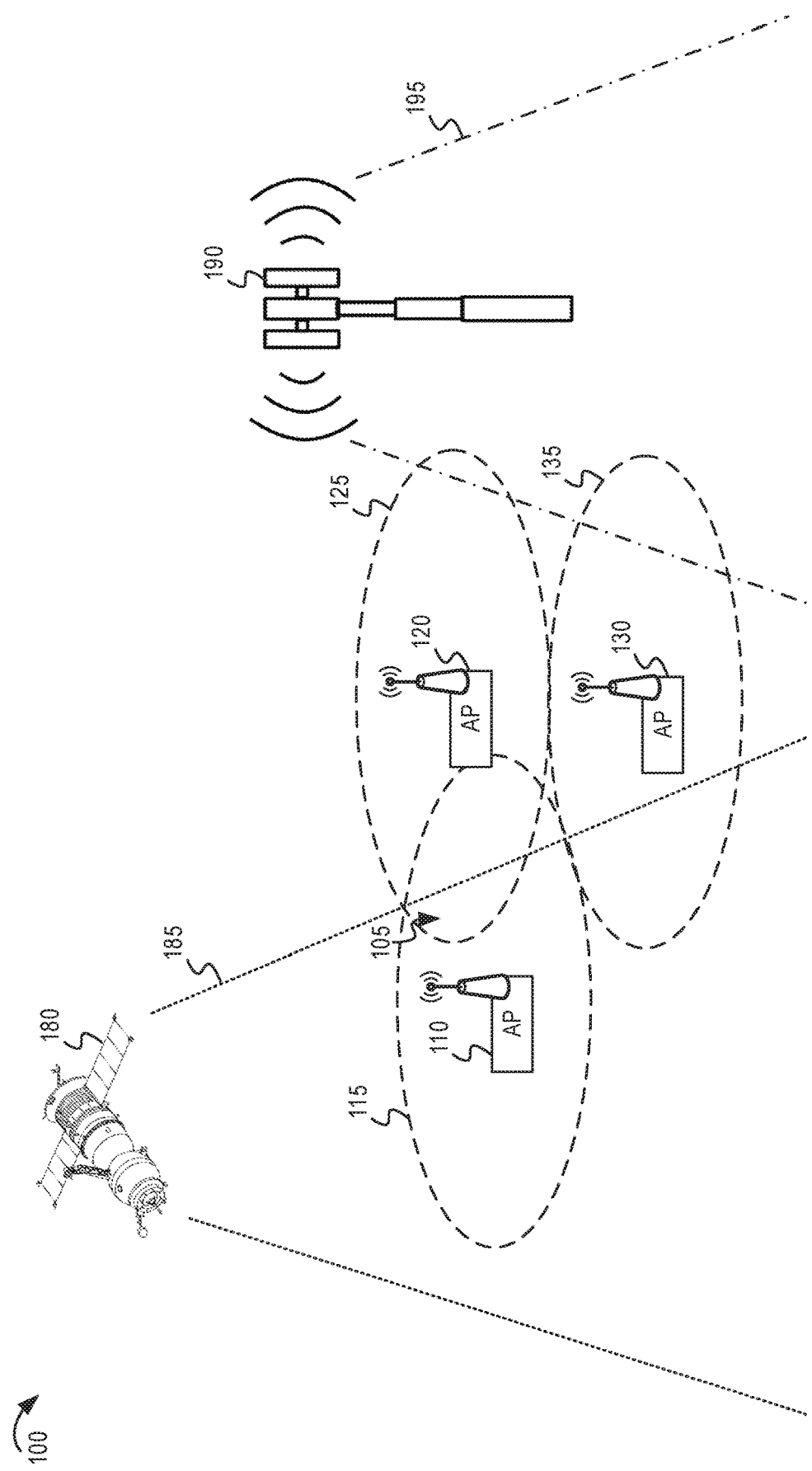
FIG. 1 depicts a system diagram of an example wireless local area network (WLAN) having multiple access points (APs) in which other networks are present in the environment.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals including any of the Institute of Electrical and Electronics Engineers (IEEE) 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

In this disclosure, a network may be referred to as a wireless local area network (WLAN) when the network includes one or more access points (APs). The WLAN may provide access to a broadband network. For example, a gateway device, such as a central access point (CAP) or router, may provide access to the broadband network via a cable, a fiber optic, a powerline, or DSL network connection. Devices in a network can establish a wireless association (also referred to as a wireless link, wireless connection, or the like) with an AP to join the WLAN. An AP may provide a wireless coverage area for devices to access the WLAN via a wireless channel (from among various wireless channels defined within a frequency band). Each AP may be associated with a different AP coverage area, and the AP coverage areas may be overlapping. Each AP may utilize one or more channels within a frequency band. A channel may refer to a portion (or frequency range) that is defined within a frequency band. The channel is used by the AP to communicate with devices that have a wireless association with the AP. Similarly, the devices utilize the channel to communicate (via a wireless association) with the AP. There may be more than one AP operating in a geographical area. For example, a WLAN may include more than one AP in a geographical area. Furthermore, there may be multiple WLANs in the geographical area. In some implementations, a geographical area may be defined in relation to a location, an apartment building, office building, home, a business address, a sports venue, or the like. In some implementations, the geographical area may be defined by a distance from a central location (such as an area encompassing a 100 foot radius from a central AP or geographical address). In some other implementations, the size of the geographical area may be set based on a communication range associated with a WLAN technology.

Signals from a first AP can cause interference to an incumbent system utilizing the same frequency band within the geographical area. For example, an incumbent satellite system may utilize a portion of a 6 GHz frequency band for satellite signals. When there are few APs (such as one AP), it may be possible to select a different channel in the frequency band to avoid overlap with the portion of the frequency band used by the incumbent satellite system. Alternatively, existing solutions may prompt an AP to vacate the portion of the frequency band used by an incumbent system. However, these approaches may be ineffective when there are multiple APs in the geographical area. For example, the other channels may become saturated, and it may not be efficient to entirely vacate portions of the frequency band.

In accordance with this disclosure, WLAN density control can be implemented to permit limited use or the use of a portion of the frequency band that is also used by an incumbent system. The WLAN density control can limit a quantity of APs that utilize the portion of the frequency band to prevent or mitigate interference caused to the incumbent system by the APs. The techniques in this disclosure may permit the use of the occupied portion of the frequency band while limiting the cumulative amount of interference caused by the APs below a threshold interference level that is acceptable to the incumbent system. For example, the threshold interference level may represent an amount of interference that is acceptable without disrupting operation of the incumbent system. In some implementations, the threshold interference level may be predetermined (such as manufacturer determined, regulated by a regulatory agency, specified in a standard specification, or the like). In some implementations, the threshold interference level (or limit) may be determined using real-time calculations, comparisons with static thresholds, historical performance, or any combination thereof.

In one aspect of this disclosure, WLAN density control may be used to coordinate the establishment and configuration of various AP coverage areas in a geographical area. The WLAN density control can limit AP utilization within a single WLAN or multiple WLANs. The WLAN density control may utilize an existing WLAN protocol or a new WLAN protocol between multiple APs to manage WLAN density in a geographical area. The WLAN density may be based on AP channel selection, the quantity of client devices, power levels, and the like. Furthermore, the WLAN density control may be responsive to the transient presence of incumbent systems utilizing the frequency band in the geographical area. For example, an incumbent system detector (such as on a rooftop or base station) may detect when signals (such as satellite transmissions) of an incumbent system are present. WLAN density control may be used to limit the interference caused by APs when the signals of the incumbent system are present.

In one aspect of this disclosure, WLAN density control also may be used to manage density of client devices associated with a particular AP. For example, an AP may implement an interference mitigation technique to manage the density of client devices are associated with the AP. For multiple APs in the same WLAN, a first AP may steer a client device to a second AP if steering the client device will reduce the cumulative amount of interference caused by the first AP, second AP, and the client device.

Particular implementations of the subject matter described in this disclosure can be implemented to realize one or more of the following potential advantages. Permitting an AP to utilize a portion of the frequency band occupied by an incumbent system may result in more overall capacity or efficient exploitation of a frequency band. WLAN density control can manage cumulative interference caused by multiple APs in a geographical area so that the multiple APs can coexist with the incumbent system. Interference mitigation techniques also may improve service to the client devices. A WLAN may benefit from improved stability as a result of managing WLAN density and client device associations. Furthermore, a WLAN and an incumbent system can co-exist in an area while minimizing possible service interruptions caused by the co-existence.

FIG. 1 depicts a system diagram of an example WLAN having multiple APs in which other networks are present in the environment. The system diagram 100 shows a first AP 110, a second AP 120, and a third AP 130. The first AP 110 provides a first AP coverage area 115. The second AP 120 provides a second AP coverage area 125. The third AP 130 provides a third AP coverage area 135. As shown at overlapping space 105, the coverage area 115 and the coverage area 125 may overlap. There may be other APs (not shown) that are also providing AP coverage areas (not shown) in the geographical area. The geographical area of FIG. 1 may include the AP coverage areas 115, 125, and 135 of the first AP 110, the second AP 120, and the third AP 130.

The system diagram 100 also shows example incumbent systems (such as a satellite system, radar system, or the like). In one example, a satellite 180 may send satellite signals 185 in the same geographical area as the coverage area 115, the coverage area 125, and the coverage area 135. A cellular communications tower 190 also may send cellular signals 195. The cellular signals 195 may be in the same geographical area as the coverage area 125 and the coverage area 135. There may be other types of incumbent systems (not shown), such as radar, terrestrial radio, television, or the like.

Each of the first AP 110, the second AP 120, and the third AP 130 may include a density control unit. For brevity, in this description, the density control techniques will be described with regard to a first AP. However, in some implementations, multiple APs may implement the density control techniques, and the density control techniques may be coordinated among multiple APs in a geographical area.

Using the system diagram 100 as an example, consider the following example density control techniques which may be implemented by the first AP 110. The first AP 110 may determine that the incumbent system (such as the satellite 180) is utilizing a first portion of a first frequency band. The first portion may overlap, at least partially, with a first channel of the first frequency band that is utilized by the first AP 110 and the second AP 120. Without considering the incumbent system, the first AP 110 and the second AP 120 may be capable of both using the same first channel even though they both have coverage areas in the overlapping space 105. However, when considering the incumbent system, the first AP 110 may be configured to limit the cumulative interference in the first portion of the first frequency band used by the incumbent system. The first AP 110 may reduce its power level for the coverage area 115 or may switch to another channel so that the cumulative interference will remain below a threshold interference level. Alternatively, the first AP 110 may coordinate with the second AP 120 to limit transmission power of either or both of the first AP 110 and the second AP 120.

In another example, the first AP 110 may be a new AP being introduced to the geographical area. The first AP 110 may detect (or otherwise determine) the existence of the incumbent system. If the new AP can do so without causing the cumulative interference to exceed the threshold interference level, the first AP 110 may utilize the first channel even though the first channel may overlap with the first portion of the frequency band used by the incumbent system. Otherwise, the first AP 110 may utilize a different channel or may prevent the establishment of an AP coverage area if utilizing the first channel would cause the cumulative interference to exceed the threshold interference level.

Figure 4:
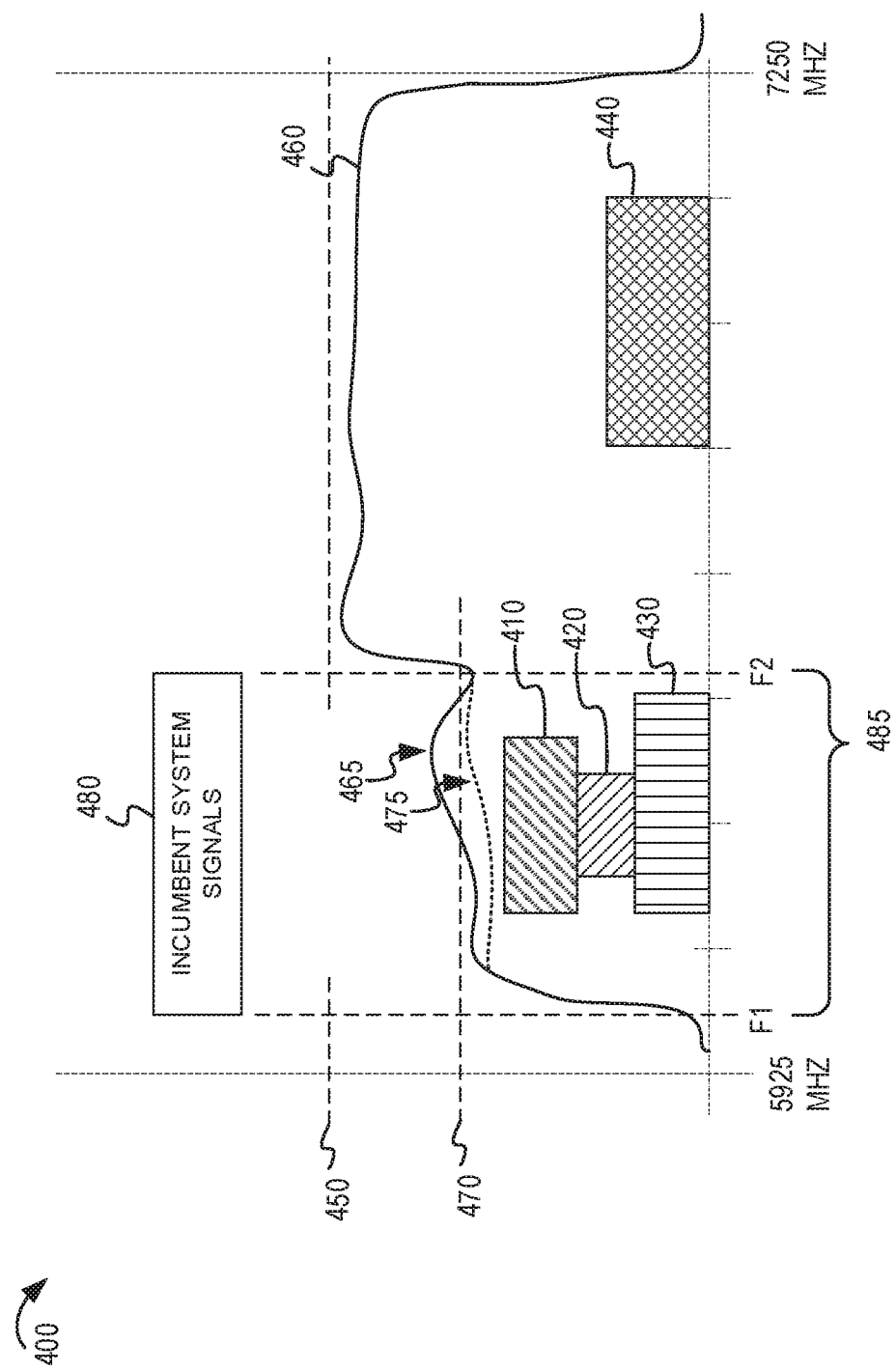
FIG. 4 depicts an example spectral density graph for a frequency band.

As described in FIGS. 4 and 5, the first AP 110 may determine a limit of APs (coexisting in a geographical area) that can utilize a channel that overlaps with the first portion of the first frequency band used by the incumbent system. The limit can be a hardware-configured value, a dynamically determined value, a system-configured value, or the like. For example, the limit may be based on empirical results in laboratory tests or other deployments of APs. Merely as a hypothetical example, consider the limit may be a value of "5," meaning that up to 5 APs in a geographical area may utilize a first channel that overlaps (at least partially) with a first portion of a frequency band used by a satellite signal. If the first AP 110 determines that there are already 5 APs utilizing the first channel, the first AP 110 may refrain from utilizing the first channel. If the first AP 110 is already utilizing the first channel, and a new AP (not shown) is introduced to the geographical area, the first AP 110 may prevent the new AP from utilizing the first channel if there are already 5 or more APs utilizing the first channel. In another implementation, the first AP 110 may attempt to switch to a different channel so to prevent the quantity of APs utilizing the first channel from remaining above the limit.

Thus, the WLAN density control may be based on cumulative interference level or may be based on a comparison of the existing quantity of APs and the limit. In some implementations of this disclosure, the first AP 110 may operate independently to implement WLAN density control or may coordinate with other APs. For example, the first AP 110 may determine the cumulative interference or the quantity of existing APs by monitoring the frequency band for signals from other APs in the geographical area. In some implementations, the first AP 110 may exchange WLAN density control information with a second AP to obtain and share interference measurements or information relevant to the quantity of existing APs in the geographical area.

Figure 2:
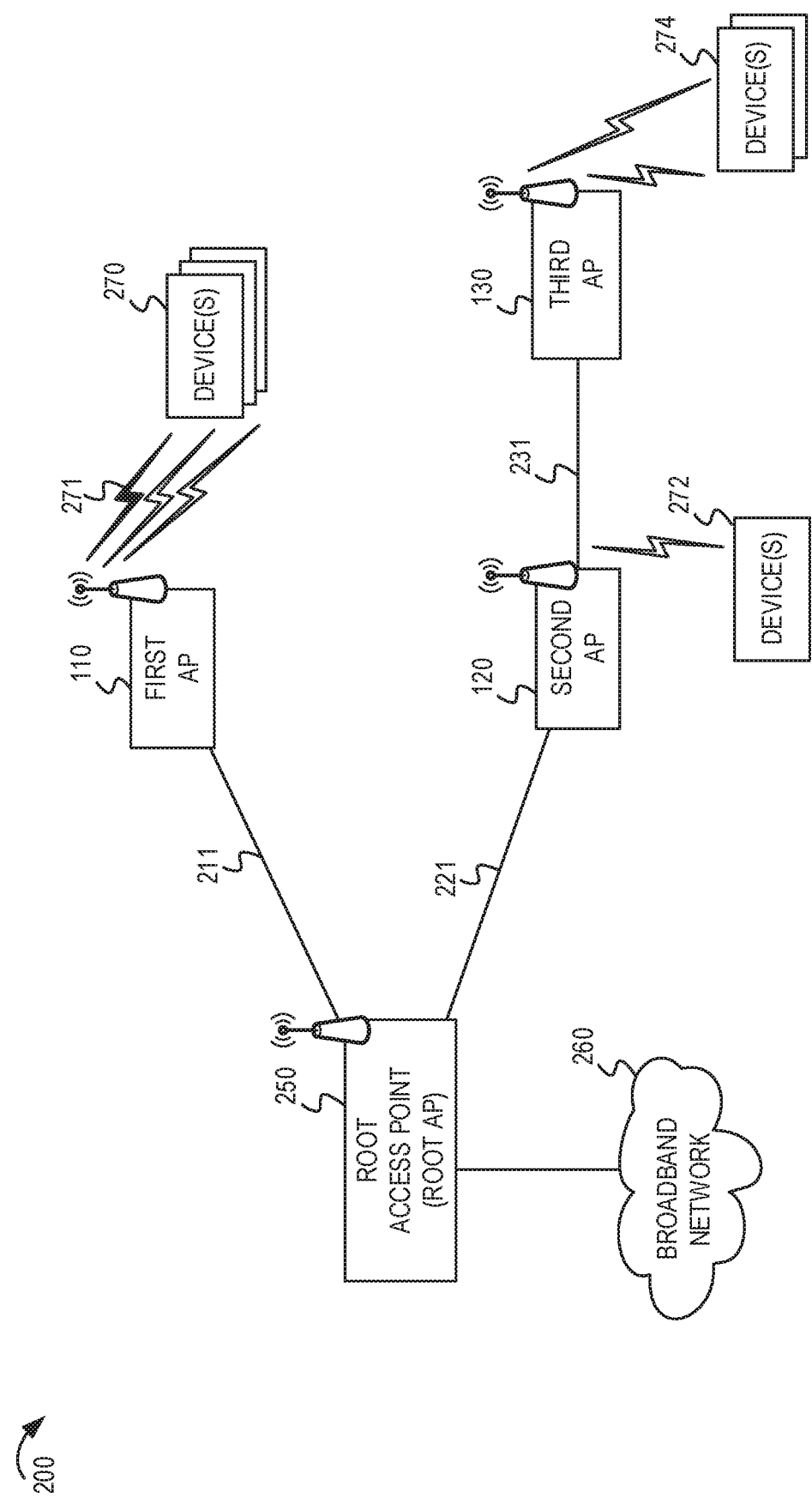
FIG. 2 depicts another system diagram of an example WLAN showing an example network topology of the example WLAN.
Figure 3:
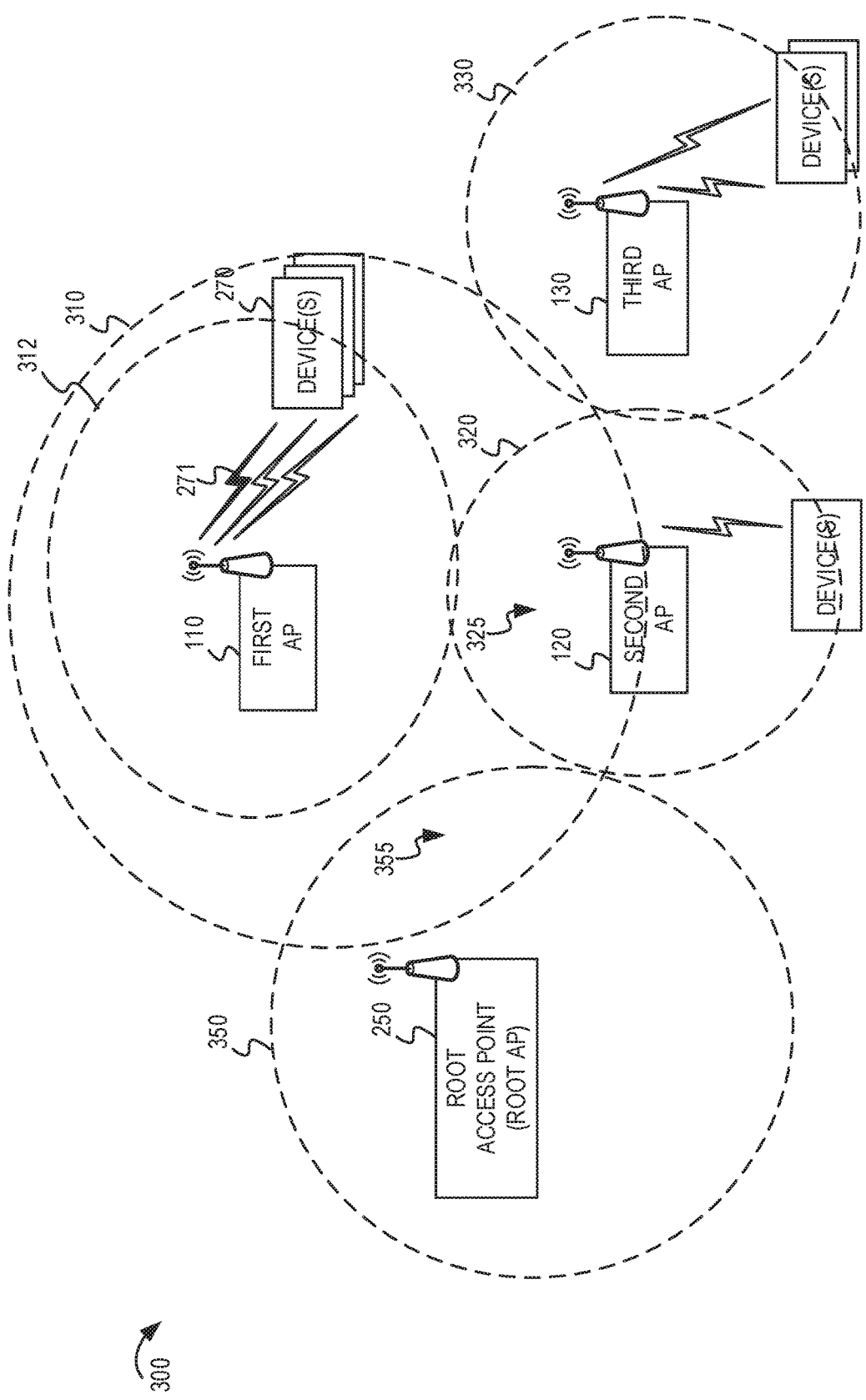
FIG. 3 depicts another system diagram of an example WLAN showing wireless coverage areas of the multiple APs.

FIG. 2 depicts another system diagram of an example WLAN showing an example network topology of the example WLAN. Another aspect of density control is based on a WLAN topology and the density of client devices associated with an AP. For example, APs can be linked in a topology to extend the overall wireless coverage of the WLAN. It is possible to combine multiple APs such that each AP is in communication with at least one other AP. In some implementations, the resulting topology may be a mesh topology. Client devices may associate with an AP that provides the highest signal strength. However, when performing an interference mitigation technique, it may be better to steer a client device to another AP or to reject a connection request from a client device. FIGS. 2 and 3 provide an example network topology which can be used to describe some hypothetical scenarios.

In some WLAN deployments, a root AP may be used in determining a routing tree. In some other WLAN deployments, the APs may form a mesh network without a root AP. The WLAN 200 includes a root AP 250 which is communicatively coupled to a broadband network 260. The root AP 250 may be separate or co-located with a gateway device (not shown). A gateway device, such as a modem or router, may provide access to the broadband network 260. For example, the gateway device can couple to the broadband network through a cable, a fiber optic, a powerline, or DSL network connection. The network also includes multiple APs, including a first AP 110, a second AP 120, and a third AP 130. Client devices can establish a wireless association (also referred to as a wireless link, wireless connection, or the like) with an AP to access the broadband network via the gateway device. For example, the wireless association may be in accordance with an association protocol associated with the wireless coverage area of the AP. In some implementations (as shown in FIG. 1), the root AP 250 is independent and separate from the multiple APs. In some other implementations, one of the multiple APs may be collocated with the root AP 250 or may be part of the same apparatus.

In the network topology depicted in FIG. 2, the first AP 110 may have a backhaul channel 211 to the root AP 250. The second AP 120 may have a backhaul channel 221 to the root AP 250. The third AP 130 may have a backhaul channel 231 to the second AP 120. As shown in FIG. 2, the third AP 130 obtains access to the broadband network 260 via the second AP 120 and root AP 250. The backhaul channels 211, 221, and 231 may be used to access the broadband network 260, but also may be used to enable communication between the first AP 110, the second AP 120, and the third AP 130. The backhaul channels 211, 221, and 231 may be any combination of wired or wireless channels. In some implementations, the APs may support both wired and wireless communication technologies, multiple wired communication technologies, or multiple wireless communication technologies. For example, the root AP 250 or the APs 110, 120, and 130 can support both IEEE 802.11 and powerline communication protocols. In some other examples, the root AP 250 or the APs 110, 120, and 130 can support a combination of IEEE 802.11 and powerline communication protocols, a combination of IEEE 802.11 and coaxial cable (Coax) based communication protocols, a combination of long-term evolution (LTE) and IEEE 802.11 communication protocols, a combination of IEEE 802.11 and Bluetooth communication protocols, and various other suitable combinations. In some implementations, the root AP 250 and the APs 110, 120, and 130 can comply with other wireless specifications, such as a ZigBee® specification, or a cellular radio specification or any other technically feasible wireless protocol. The link between the root AP 250 and the broadband network 260 can be referred to as a broadband link. The broadband link can provide at least a portion of a data pathway to another network (such as a communication service provider network, the Internet, etc.). The broadband link of the root AP 250 can be a wireless, a wired (such as through an Ethernet or powerline connection), or a hybrid link.

In FIG. 2, one or more client devices 270, 272, and 274 may be wirelessly associated with the first AP 110, the second AP 120, and the third AP 130, respectively. The amount of interference contributed by a particular AP may depend on the quantity of client devices utilizing the AP. For example, the first AP 110 may cause a higher interference to an incumbent system as a result of having more client devices than it would if it had fewer client devices. In a hypothetical example, the amount of interference for the first AP 110 (and the cumulative interference in the geographical area) may be reduced by moving one of the client devices 270 from the first AP 110 to the second AP 120. In another hypothetical example, if the first AP 110 receives a request for a connection from a new client device, the first AP 110 may reject the request to prevent the interference for the first AP 110 (and the cumulative interference in the geographical area) from increasing above a threshold interference level.

FIG. 3 depicts another system diagram of an example WLAN showing wireless coverage areas of the multiple APs. The system diagram 300 shows the root AP 250, the first AP 110, the second AP 120, and the third AP 130 as described in FIG. 2. The backhaul links and communication paths for the WLAN are removed for clarity. Instead, the system diagram 300 shows the AP coverage areas 350, 310, 320, and 330 corresponding to the root AP 250, the first AP 110, the second AP 120, and the third AP 130, respectively. The initial first AP coverage area 310 for the first AP 110 may have some overlapping spaces with neighboring APs in the geographical area. For example, arrow 325 shows an overlapping space of the coverage areas 310 and the second AP coverage area 320 of the second AP 120. Arrow 355 shows an overlapping space of the coverage areas 310 and the root AP coverage area 350 of the root AP 250. Using FIG. 3 as a hypothetical example, the first AP 110 may detect the presence of an incumbent system that utilizes a first portion of the frequency band. In some implementations, the incumbent system may be a transient system, such as a satellite that can temporarily pass near the geographical area. The first AP 110 may determine whether a signal of the incumbent system has been detected in the geographical area. For example, the first AP 110 may be integrated or communicatively coupled with an incumbent system detector that can detect the presence of the signal of the incumbent system. The first AP 110 may implement a WLAN density control or interference mitigation technique (or both) when the signal of the incumbent system is detected.

The first AP 110 may determine that the cumulative interference level at the overlapping spaces 325 and 355 are higher than a threshold interference level. For example, the first AP 110 may estimate the cumulative interference based on interference measurements by the first AP 110, interference measurement reports received from one or more client devices, the root AP 250, or the second AP 120, or any combination thereof. In response to determining that the cumulative interference is above the threshold interference level, the first AP 110 may perform an interference mitigation technique. In the example shown in FIG. 3, the first AP 110 may temporarily reduce its transmitter power. FIG. 3 shows an updated first coverage area 312 that may result from the change in transmitter power. As described further in FIGS. 7 and 10, there may be other techniques that the first AP 110 can perform to prevent or mitigate interference to an incumbent system.

FIG. 4 depicts an example spectral density graph for a frequency band. The example spectral density graph 400 shows a frequency band from 5925 MHz to 7250 MHz. The frequency band may be referred to as a 6 GHz frequency band. The spectral density graph 400 shows a first portion 485 (frequency range from F1 to F2) of the frequency band being used by an incumbent system to transmit incumbent system signals 480. Although FIG. 4 shows one incumbent system, in practical deployments, there may be multiple incumbent systems (not shown) that may occupy various portions of the frequency band. For brevity and clarity, the description of FIG. 4 describes one incumbent system which is operating in the first portion 485. To prevent interference with the incumbent system, the signals from WLAN devices that are within the first portion 485 should be kept below a threshold interference level 470. In some other portions of the frequency band which are not being used by other incumbent systems, the signals from WLAN devices may be increased up to a target interference level 450 (such as a maximum interference level permitted by a technical standard or regulatory agency).

The spectral density graph 400 shows a cumulative interference 460 caused by the WLAN devices operating within the frequency band. Arrow 465, the spectral density graph 400 shows that the cumulative interference 460 exceeds the threshold interference level 470. To comply with the threshold interference level 470, one or more of the APs in the geographical area should modify its configuration so that the cumulative interference 460 will not exceed the threshold interference level 470. Arrow 475 shows the resulting cumulative interference after a first AP performs a technique to reduce WLAN density or to reduce interference.

The spectral density graph 400 also shows utilization of the frequency band by several APs. A first AP may utilize a portion of the frequency band associated with range 410. A second AP may utilize a portion of the frequency band associated with range 420. A third AP may utilize a portion of the frequency band associated with range 430. Ranges 410, 420, and 430 may be various channels used by the APs and their associated client devices. Ranges 410, 420, and 430 are depicted as stacked for illustrative purposes. The height of each range is used to show the amount of interference that each of the APs is contributing to the cumulative interference 460. Other ranges or channels (not shown) may be used by other WLAN devices (not shown) in the geographical area.

In a first hypothetical scenario, a new AP is introduced to the geographical area. The new AP may initially attempt to establish a WLAN within the first portion 485. However, based on the threshold interference level 470 and the fact that the cumulative interference should be kept below the threshold interference level 470, the new AP may refrain from establishing a new WLAN in the first portion 485. For example, the new AP may scan the frequency band and determine that three APs are already utilizing ranges 410, 420, and 430 within the first portion 485. If a limit of coexisting APs utilizing the first portion 485 has been reached, the new AP may refrain from using the first portion 485. Alternatively, the new AP may detect and measure the cumulative interference 460 and determine that establishment of a new WLAN in the first portion 485 would result in the cumulative interference exceeding the threshold interference level 470. To avoid the first portion 485, the new AP may establish a WLAN using a range 440 that is not within the first portion 485.

In a second hypothetical scenario, the APs may be operating in ranges 410, 420, 430, and 440. A new client device may enter the geographical area and request a connection with a first AP associated with range 410. However, the first AP may determine that the addition of the new client device would result in the cumulative interference exceeding the threshold interference level 470. The first AP may reject the request. In some implementations, the first AP may cause the new client device to associate with another AP, such as the AP operating in range 440.

In a third hypothetical scenario, the APs may be operating in ranges 410, 420, 430, and 440. A first AP associated with range 410 may determine that the cumulative interference 460 is exceeding the threshold interference level 470 within the first portion 485. The first AP may perform an interference mitigation technique to reduce the cumulative interference. For example, the first AP may cause one or more client devices to associate with another AP, such as the AP operating in range 440.

FIG. 5 depicts a flowchart of example techniques for managing WLAN density. The flowchart 500 begins at block 510. At block 510, a first AP may determine a limit of APs that can utilize at least a first portion of a first frequency band in a geographical area based, at least in part, on an estimated amount of interference that would be caused by the APs to an incumbent system. For example, the limit may be determined to prevent the estimated amount of interference that would be caused by the APs to the incumbent system from exceeding a threshold interference level. There may be many ways for the first AP to determine the limit. In some implementations, the first AP may retrieve the limit from a pre-programmed configuration parameter of the first AP. In another implementation, the first AP may receive an indication of the limit from a centralized server or root AP associated with the WLAN. In another implementation, the first AP may calculate the limit based on historical measurements of interference for different quantities of APs utilizing the first portion of the first frequency band in the geographical area. For example, the first AP may maintain a history of previous amounts of interference for different quantities of APs utilizing the first portion of the first frequency band in the geographical area. The first AP may determine the limit based on the history of previous amounts of interference for different quantities of APs. In some implementations, the limit may be a maximum limit of coexisting APs that will be permitted to utilize the first portion of the first frequency band in the geographical area.

At block 520, the first AP may determine a quantity of existing APs in the geographical area that is currently utilizing at least the first portion of the first frequency band. For example, the first AP may monitor or scan the frequency band to determine the existing APs that are in the geographical area and that are operating in the frequency band. The first AP may utilize beacon messages or request and response messages within the frequency band. In some implementations, the first AP may exchange messages with other APs to coordinate WLAN density control information that can be used to determine the quantity of existing APs in the geographical area or the cumulative interference caused by the existing APs.

At block 530, the first AP may manage a configuration of the first AP based on a comparison of the quantity of existing APs and the limit. For example, if the quantity of existing APs is equal to or more than the limit, the first AP may modify a power level, channel selection, or frequency band used for a first AP coverage area of the first AP. Managing the configuration of the first AP may include reducing a WLAN density in the geographical area. Example techniques to reduce the WLAN density are described with regard to FIG. 7.

Figure 6:
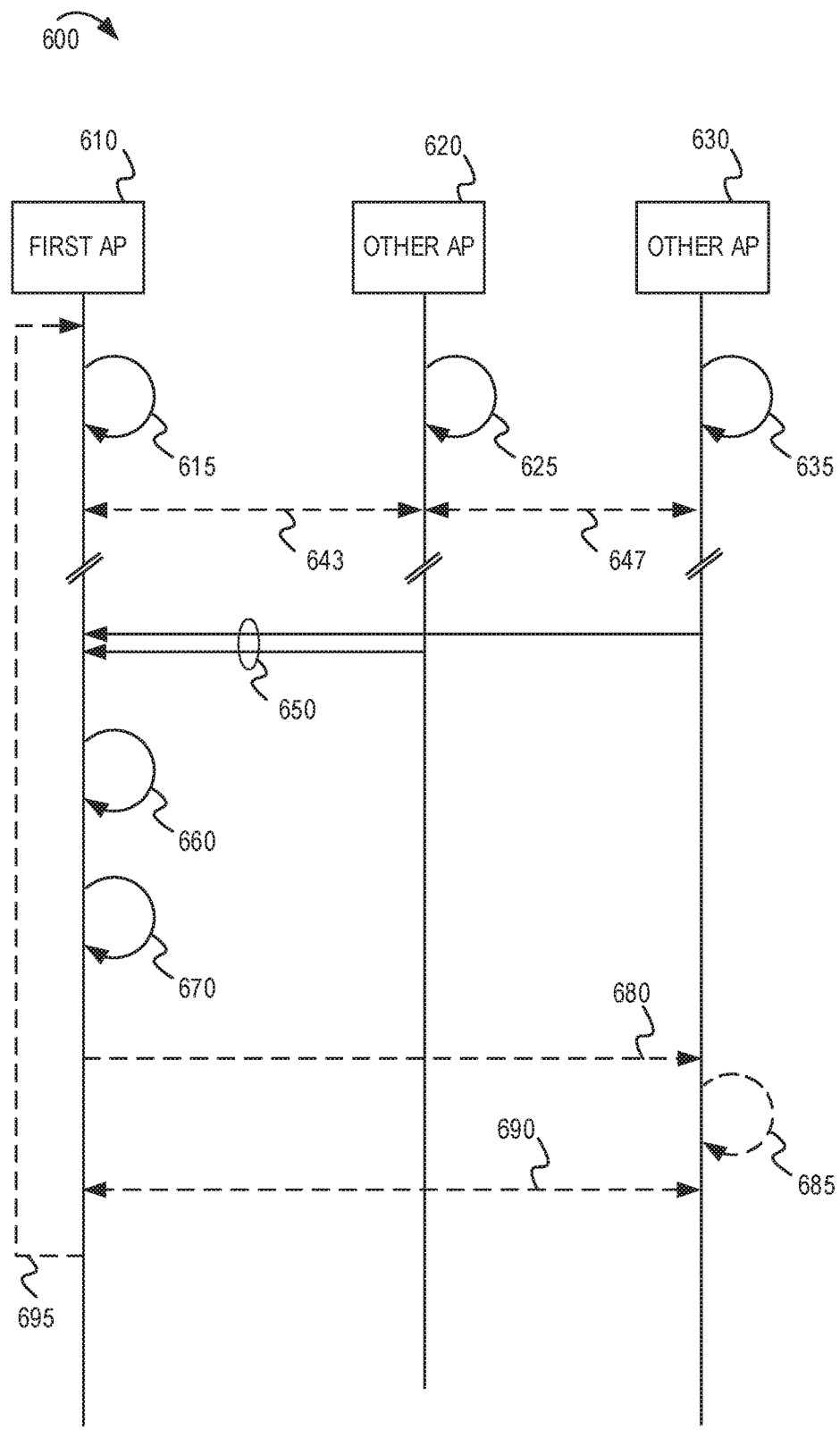
FIG. 6 depicts a message flow diagram of an example implementation for WLAN density control.

FIG. 6 depicts a message flow diagram of an example implementation for WLAN density control. The message flow diagram 600 shows a first AP 610 and other APs 620 and 630. At process 615, the first AP 610 may perform passive or active scanning of the frequency band. For example, the first AP 610 may measure interference caused by neighboring APs and may determine a quantity of APs operating at different portions of the frequency band. The other APs 620 and 630 may perform similar activities at process 625 and 635, respectively. Shown at arrows 643 and 647, the APs 610, 620, and 630 determine the presence the other APs in the geographical area based on the information obtained by the processes 615, 625, and 635.

In some implementations, the APs may exchange WLAN density control information. For example, the APs may share interference measurements regarding at least the first portion of the first frequency band or identification of existing APs in the geographical area. Shown at arrows 650, the first AP 610 may receive WLAN density control information from the other APs 620 and 630. In some implementations, the WLAN density control information may be included in messages defined by a protocol for WLAN devices. For example, in some implementations, the information may be provided in beacon messages.

At process 660, the first AP 610 may estimate a medium utilization for one or more portions of the frequency band. The first AP 610 also may estimate the interference levels for the one or more portions. For example, the estimated interference levels may be based on a quantity of client devices, reported received signal strength indicator (RSSI) levels, or other WLAN density control information from the other APs 620 and 630. The first AP 610 also may determine the presence of an incumbent system in a first portion of the frequency band. For example, the first AP 610 may detect signals from the incumbent system. In another example, the first AP 610 may determine the presence of the incumbent system based on a database or other information for coordinating the utilization of the frequency band. In some implementations, the first AP 610 may determine the position of a satellite above the geographical area in which the first AP 610 is operating.

At process 670, the first AP 610 may determine whether to perform an interference prevention or mitigation technique. For example, the first AP 610 may determine to reduce the WLAN density at the first portion of the frequency band that is being used by an incumbent system. At arrow 680, the first AP 610 may communicate with the other AP 630 to coordinate the interference mitigation technique. For example, the first AP 610 may inform the other AP 630 of the interference mitigation technique. In another example, the first AP 610 may inform the other AP 630 of the detected incumbent system or the estimated cumulative interference for the portion of the frequency band. At process 685, the other AP 630 may determine whether an interference mitigation technique should be performed by the other AP 630. At arrow 690, the first AP 610 and the other AP 630 may coordinate the performance of interference mitigation techniques.

The processes and messages described in message flow diagram 600 may be iterative, shown by arrow 695. For example, the first AP 610 may periodically or continuously perform processes 660 and 670. In a subsequent performance of processes 670, the first AP 610 may determine that the cumulative interference is below the threshold interference level and may not perform an interference mitigation technique if it is not needed.

FIG. 7 depicts a flowchart of example techniques for reducing WLAN density. The flowchart 700 begins at block 710. At block 710, a first AP may determine to reduce WLAN density in a geographical area. In some implementations, the first AP may determine a medium utilization per channel based on metrics such as RSSI, quantity of active transmitters on the channel, proximity of other nearby APs utilizing the channel, or other metrics for quantifying WLAN density per channel. The first AP may assign a penalty value (or priority value) for each channel based on the medium utilization metrics. Upon detection of an incumbent system, the first AP begin with possible changes (such as those in blocks 720-750) to the channel with the highest penalty value in an attempt to control interference to the incumbent system. In some other implementations, the first AP may utilize a pre-determined set of parameters to determine when to reduce WLAN density. For example, the pre-determined set of parameters may include a limit, such as a limit for a quantity of APs in the area, a limit regarding client connections per channel, a limit regarding transmit power, or any combination thereof. After determining to reduce WLAN density, the first AP may have several options for techniques to reduce the WLAN density. For example, the flow may continue to one or more of the blocks 720, 730, 740, and 750 depicting various possible implementations which may be used individually or in various combinations. In some implementations, the selection or order of blocks 720, 730, 740, and 750 may be predetermined or deterministically determined.

At block 720, the first AP may refrain from establishing the first AP coverage area utilizing the first portion of the first frequency band. For example, if the first AP has not already established the first AP coverage area, the first AP may be prevented from establishing the first AP coverage area using a channel that overlaps with the first portion of the frequency band.

At block 730, the first AP may configure the first AP coverage area to utilize a second portion of the first frequency band that is different from the first portion. For example, the second portion may not be used by an incumbent system or may be less saturated.

At block 740, the first AP may configure the first AP coverage area to utilize a second frequency band that is different from the first frequency band. For example, the first AP may utilize a 2.4 GHz or 5 GHz frequency band if the 6 GHz frequency band is saturated by incumbent systems or other WLAN devices.

At block 750, the first AP may reduce the quantity of existing APs that are utilizing the first portion of the first frequency band by causing a second AP to modify a second AP coverage area of the second AP. For example, the first AP may cause the second AP to switch to a different channel or different frequency band.

Figure 8:
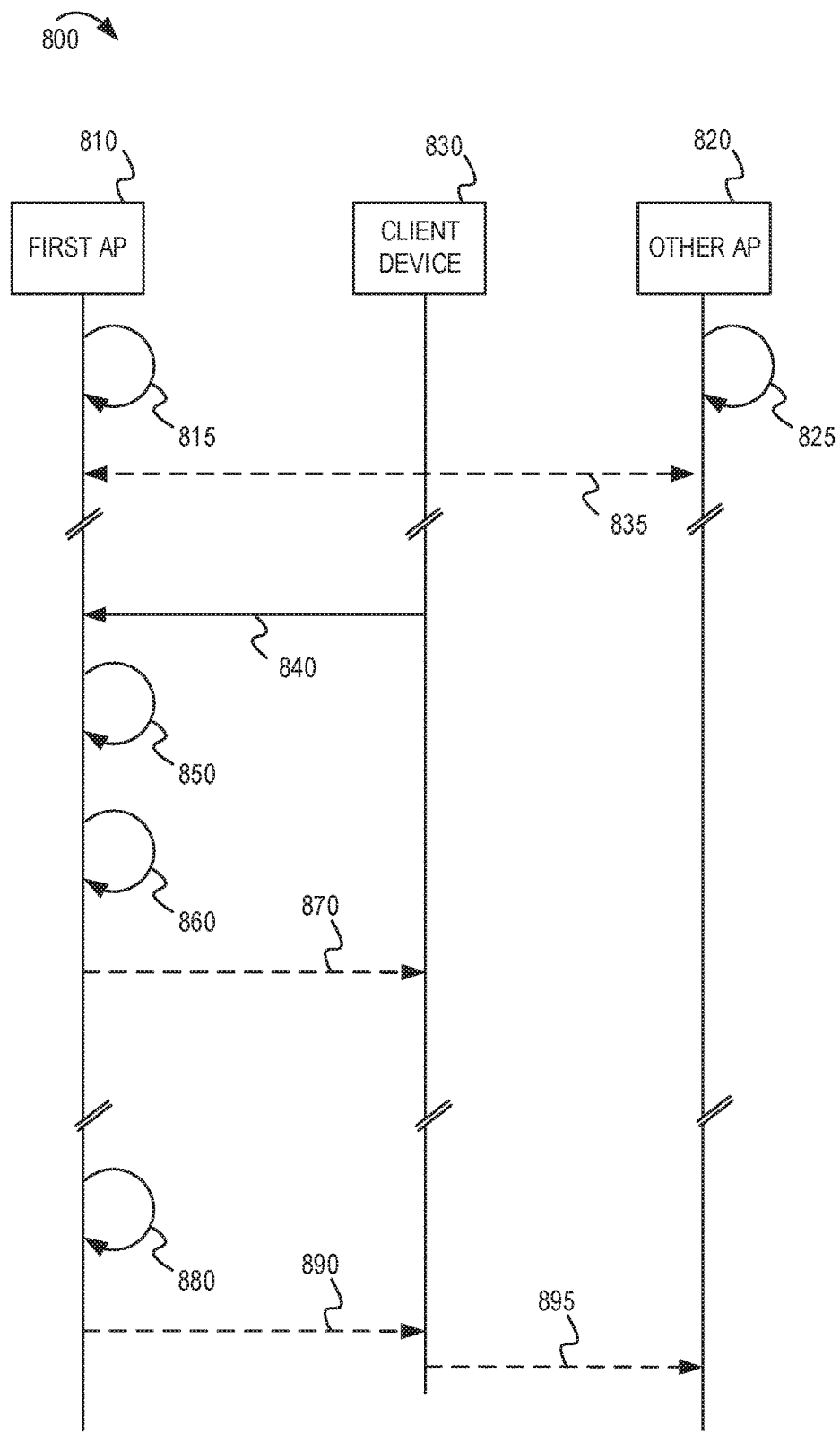
FIG. 8 depicts a message flow diagram of an example implementation for managing density of client devices associated with a first AP.

FIG. 8 depicts a message flow diagram of an example implementation for managing density of client devices associated with a first AP. The message flow diagram 800 shows a first AP 810, one other AP 820, and a client device 830. At process 815, process 825, and arrow 835, the first AP 810 and the other AP 820 may perform activities similar to the corresponding process 615, process 625, and arrow 643 described in FIG. 6. As a result, the first AP 810 can generate or obtain the WLAN density control information.

Shown at arrow 840, the first AP 810 may receive a request from the client device 830 for a new connection between the client device 830 and the first AP 810. At process 850, the first AP 810 may determine a projected amount of cumulative interference to an incumbent system that would result from granting the request. At process 860, the first AP 810 may determine whether to grant or reject the request based on whether the projected amount of cumulative interference exceeds a threshold interference level. At arrow 870, the first AP 810 may grant or deny the request.

FIG. 8 also shows another example scenario which may occur after the client device 830 has associated with the first AP 810. At process 880, the first AP 810 may determine that the amount of cumulative interference to the incumbent system has exceeded the threshold interference level. The first AP 810 may determine to perform an interference mitigation technique. In the example scenario, the first AP 810 may determine to move the client device 830 from the first AP 810 to the other AP 820. For example, causing the client device 830 to move to the other AP 820 may permit the first AP 810 to reduce its transmitter power. At arrow 890, the first AP 810 may send a message to cause the client device 830 to move to a new connection 895 with the other AP 820.

Figure 9:
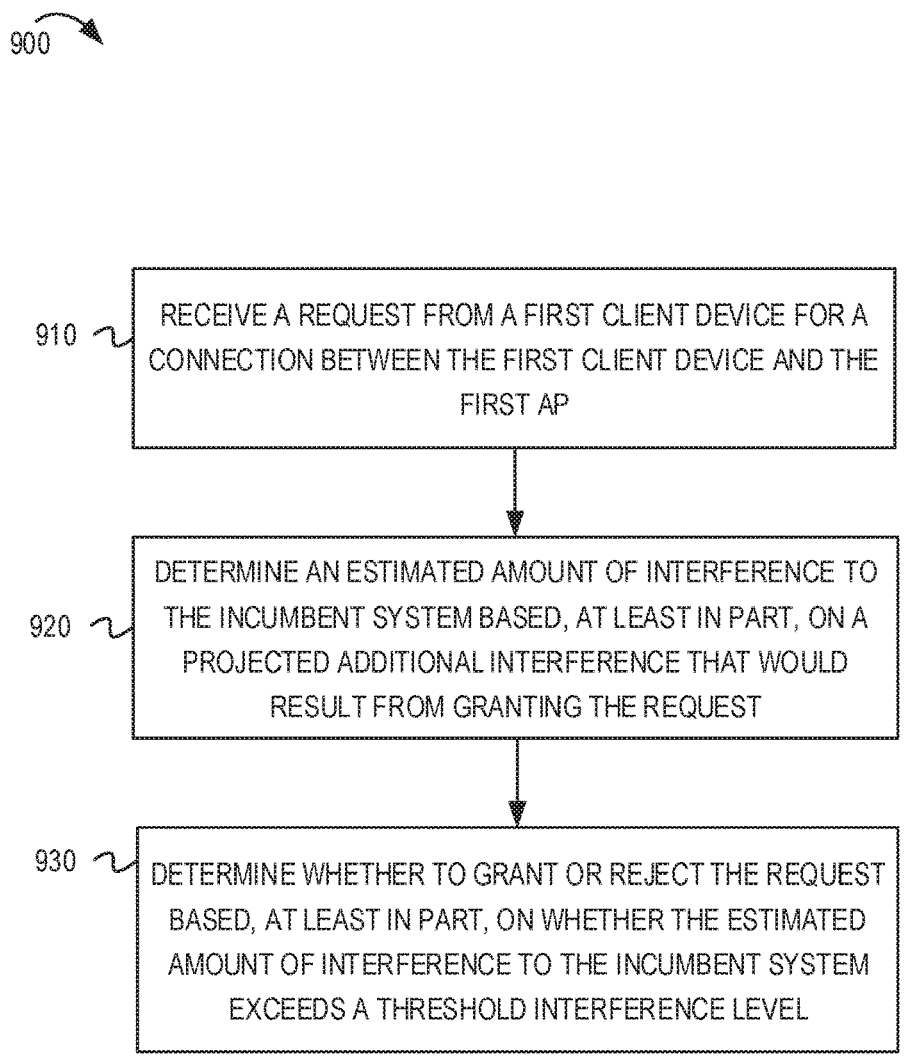
FIG. 9 depicts a flowchart of example techniques for controlling association of a client device with a first AP.

FIG. 9 depicts a flowchart of example techniques for controlling association of a client device with a first AP. The flowchart 900 begins at block 900. At block 910, the first AP may receive a request from a first client device for a connection between the first client device and the first AP. At block 920, the first AP may determine an estimated amount of interference to an incumbent system. The estimated amount of interference may be based on a projected additional interference that would result from granting the request. At block 930, the first AP may determine whether to grant or reject the request based, at least in part, on whether the estimated amount of interference to the incumbent system exceeds a threshold interference level.

Figure 10:
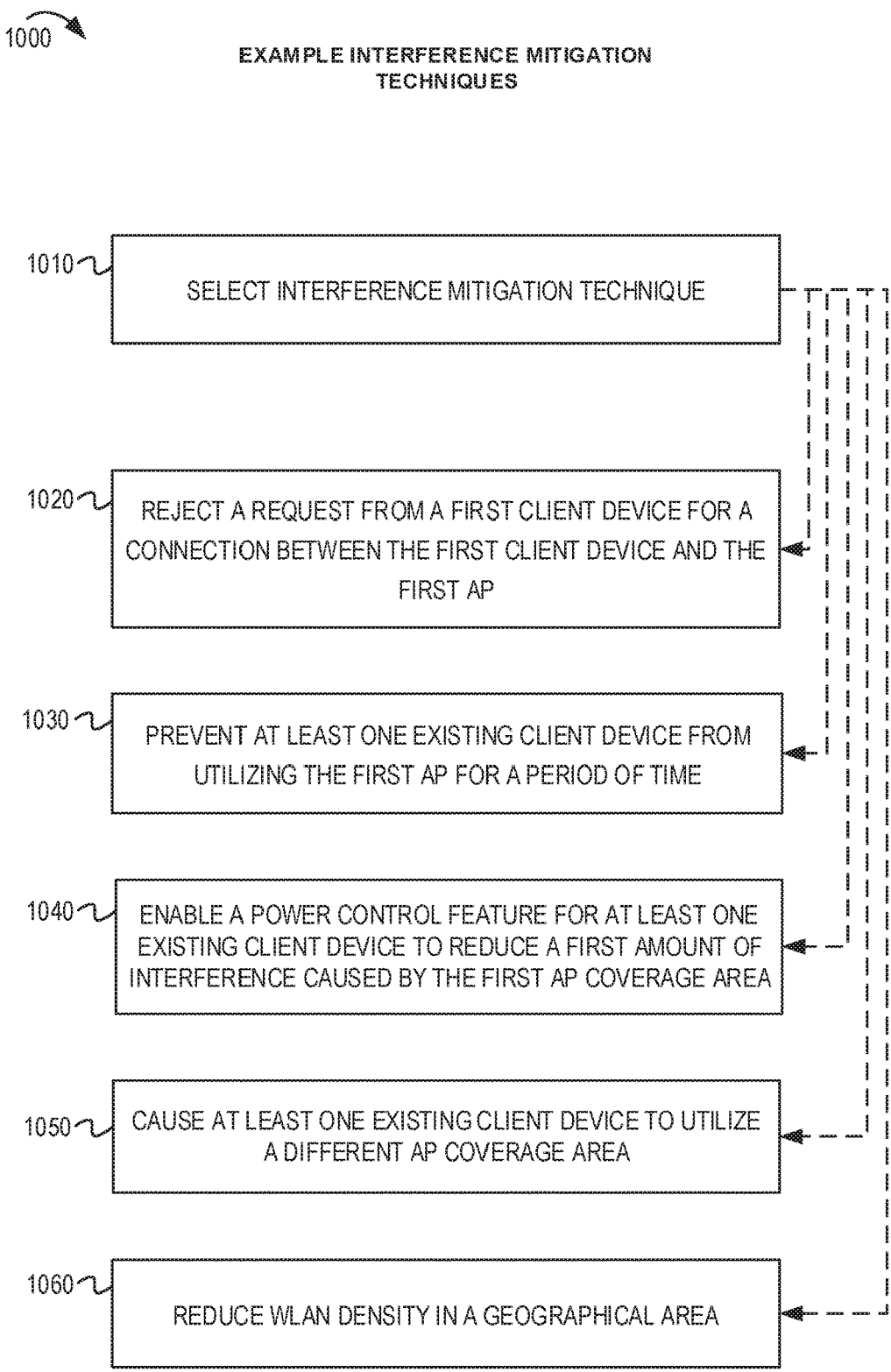
FIG. 10 depicts a flowchart of example interference mitigation techniques.

FIG. 10 depicts a flowchart of example interference mitigation techniques. The flowchart begins at block 1000. At block 1010, a first AP may select an interference mitigation technique. The first AP may have several options for interference mitigation techniques. The criteria for choosing the technique (or order of techniques) may be based on how much the system needs to mitigate interference, or how fast the system should mitigate interference. In some implementations, the first AP use a pre-determined set of parameters that specify the order of interference mitigation. Using the pre-determined set of parameters may avoid the first AP having to perform complex analysis or real-time computations. In some other implementations, such as when the satellite system path is favorable for real-time interference estimation, the first AP may dynamically select a real-time mitigation technique to minimize performance and service impact to the first AP while meeting requirements for satellite system. The satellite system path may be favorable in situations when a satellite position can be predicted (or detected sooner) to be in the geographical area (or field of view) of the first AP. In such situations, the first AP may have more time available to do real-time calculations associated with the real-time mitigation techniques, such as those in blocks 1020-1060. The flow may continue to one or more of the blocks 1020, 1030, 1040, 1050 and 1060.

At block 1020, the first AP may reject a request from a first client device for a new connection between the first client device and the first AP.

At block 1030, the first AP may prevent at least one existing client device from utilizing the first AP for a period of time. For example, the first AP may disable communication with the existing client device during a time period that the incumbent system is utilizing the first portion of the frequency band.

At block 1040, the first AP may enable a power control feature for at least one existing client device to reduce the first amount of interference caused by the first AP coverage area.

At block 1050, the first AP may cause at least one existing client device to utilize a different AP coverage area. For example, the first AP may cause the existing client device to switch to another channel utilized by the first AP or to another AP.

At block 1060, the first AP may reduce the WLAN density in the geographical area. For example, the first AP may perform one or more of the techniques described in FIG. 7.

Figure 11:
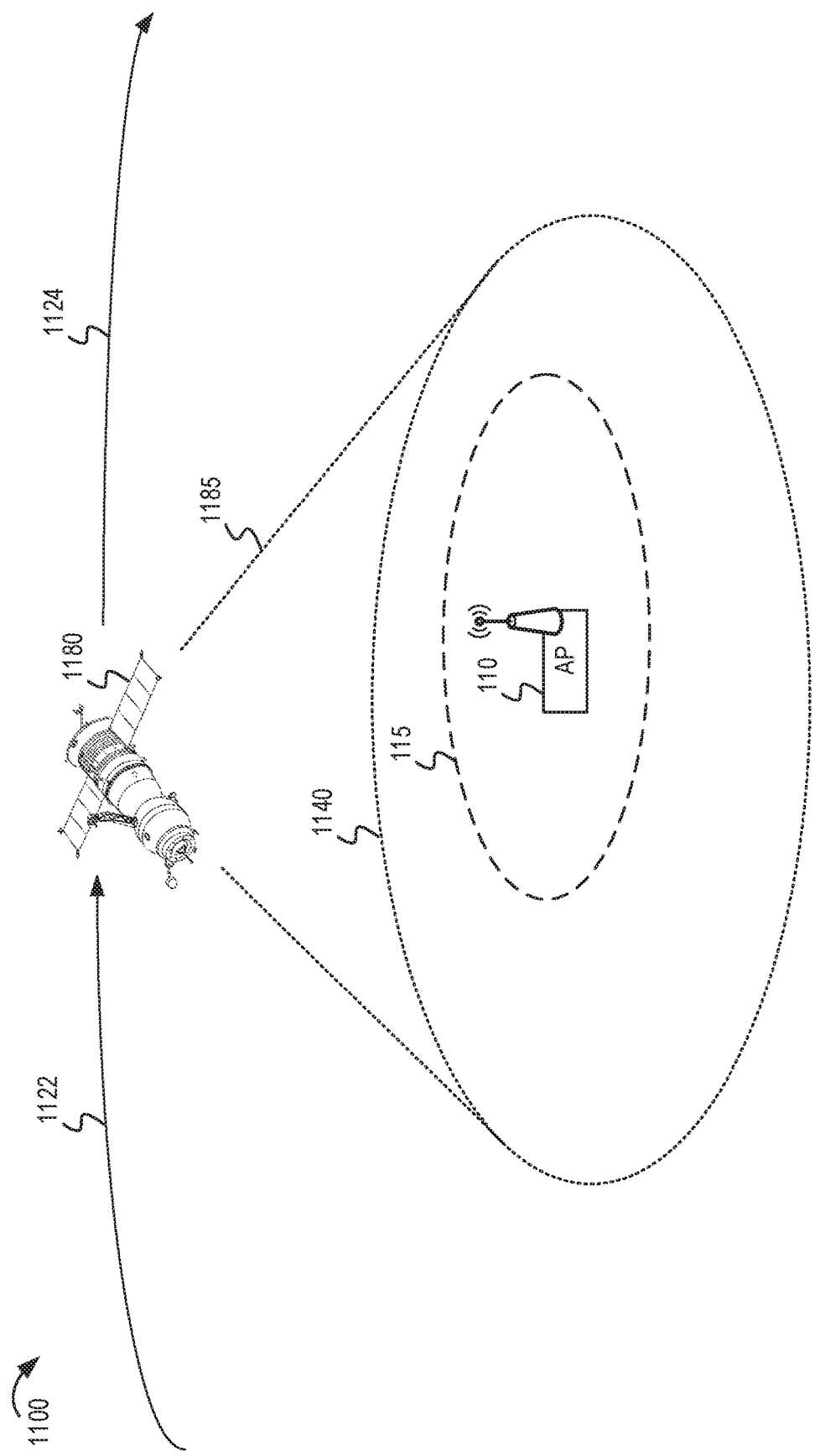
FIG. 11 depicts another example system diagram describing WLAN density control based on a satellite coverage area for a satellite signal of a satellite.

FIG. 11 depicts another example system diagram describing WLAN density control based on a satellite coverage area for a satellite signal of a satellite. The system diagram 1100 shows the first AP 110 and its corresponding first AP coverage area 115. A satellite 1180 is shown above the coverage area 115. In some implementations, the satellite 1180 may be geostationary. In some other implementations, the satellite 1180 may have a non-stationary orbit around the Earth. In the example of FIG. 11, the satellite 1180 is shown moving along an orbit illustrated by arrows 1122 and 1124.

The satellite 1180 may be an incumbent system that is utilizing the first portion of a frequency band. The satellite 1180 is communicating satellite signals. A satellite coverage area 1140 shows the footprint of the satellites communication based on the current geographical position of the satellite. In FIG. 11, the satellite coverage area 1140 currently overlaps the coverage area 115 of the first AP 110. Therefore, the first AP 110 may perform the WLAN density control techniques or interference mitigation techniques described herein to prevent the cumulative interference in the coverage area 115 from exceeding a threshold interference level. Thus, the threshold interference level may be based on a comparison of the satellite coverage area 1140 for the satellite signal 1185 and a location of first AP 110. As the satellite 1180 moves along the orbit 1124, the satellite coverage area 1140 may exit the coverage area 115. Once the satellite coverage area 1140 does not overlap the coverage area 115, the first AP 110 may change the threshold interference level to reflect the incumbent system has left. For example, the first AP 110 may raise the threshold interference level up to a target interference level permitted by a technical standard or jurisdictional regulation.

There may be different ways for the first AP 110 to detect the presence (or arrival) of the satellite 1180 above the location of the first AP 110. In some implementations, the first AP 110 may determine the satellite coverage area for the satellite signal based on a current geographical position of the satellite. For example, the first AP 110 may obtain the current geographical position of the satellite from a satellite tracking server. The first AP 110 also may determine the location of the first AP. For example, the first AP 110 may utilize the Global Positioning System (GPS), the Global Navigation Satellite System (GLONASS), the Galileo positioning system (Galileo), the Indian Regional Navigation Satellite System (IRNSS), BeiDou Navigation Satellite System (BDS), the Quasi-Zenith Satellite System (QZSS), or the like, to determine the current geographical location of the first AP.

In some implementations, an incumbent system detector (such as a satellite tracker or signal detector) may be used to determine when a satellite is passing over the geographical area. For example, the incumbent system detector may be a rooftop appliance, a satellite receiver, antenna system, or the like, which is capable of detecting a signal from the incumbent system. The incumbent system detector may send a communication to one or more APs in the geographical area to indicate the presence of the signal from the incumbent system.

Figure 12:
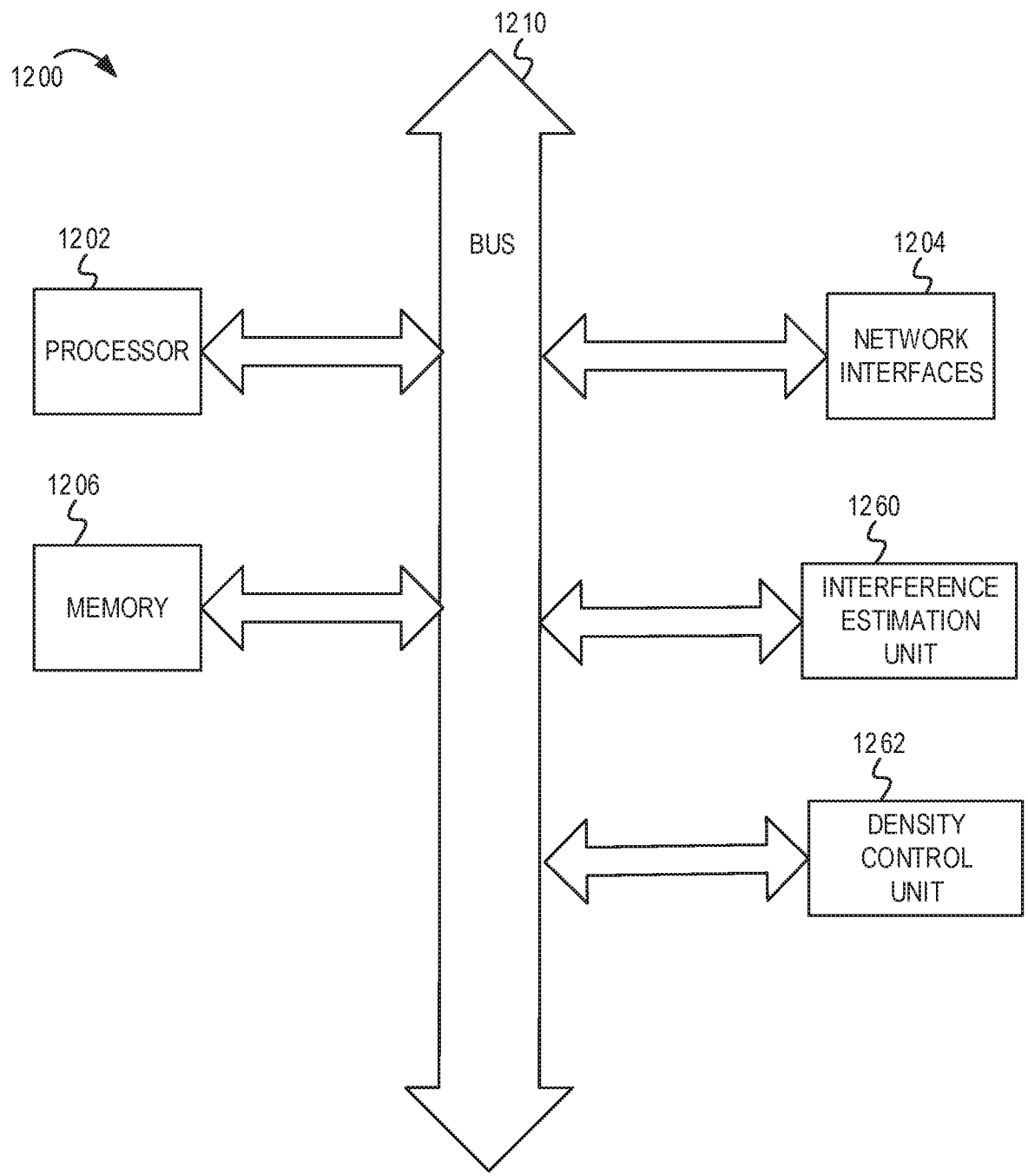
FIG. 12 shows a block diagram of an example electronic device for implementing aspects of this disclosure.

FIG. 12 shows a block diagram of an example electronic device for implementing aspects of this disclosure. In some implementations, the electronic device 1200 may be one of an access point (including any of the APs described herein), a range extender, or other electronic systems. The electronic device 1200 can include a processor unit 1202 (possibly including multiple processors, multiple cores, multiple nodes, or implementing multi-threading, etc.). The electronic device 1200 also can include a memory unit 1206. The memory unit 1206 may be system memory or any one or more of the below-described possible realizations of computer-readable media. The electronic device 1200 also can include a bus 1210 (such as PCI, ISA, PCI-Express, Hyper-Transport®, InfiniBand®, NuBus, AHB, AXI, etc.), and a network interface 1204 that can include at least one of a wireless network interface (such as a WLAN interface, a Bluetooth® interface, a WiMAX interface, a ZigBee® interface, a Wireless USB interface, etc.) and a wired network interface (such as an Ethernet interface, a powerline communication interface, etc.). In some implementations, the electronic device 1200 may support multiple network interfaces—each of which is configured to couple the electronic device 1200 to a different communication network.

The electronic device 1200 may include an interference estimation unit 1260 and a density control unit 1262. In some implementations, the interference estimation unit 1260 and the density control unit 1262 can be distributed within the processor unit 1202, the memory unit 1206, and the bus 1210. The interference estimation unit 1260 and the density control unit 1262 can perform some or all of the operations described in FIGS. 1-11 above. For example, the interference estimation unit 1260 can determine the limit of APs that can utilize at least a first portion of a first frequency band in a geographical area based on an estimated amount of interference that would be caused by the APs. The interference estimation unit 1260 also may collect interference measurements from other APs or client devices and can determine a current cumulative amount of interference caused by the existing APs in the geographical area. The density control unit 1262 can implement the WLAN density control techniques. For example, the density control unit 1262 can implement techniques to reduce the WLAN density or perform the interference mitigation techniques described herein.

The memory unit 1206 can include computer instructions executable by the processor unit 1202 to implement the functionality of the implementations described in FIGS. 1-11. Any one of these functionalities may be partially (or entirely) implemented in hardware or on the processor unit 1202. For example, the functionality may be implemented with an application specific integrated circuit, in logic implemented in the processor unit 1202, in a co-processor on a peripheral device or card, etc. Further, realizations may include fewer or additional components not illustrated in FIG. 12 (such as video cards, audio cards, additional network interfaces, peripheral devices, etc.). The processor unit 1202, the memory unit 1206, and the network interface 1204 are coupled to the bus 1210. Although illustrated as being coupled to the bus 1210, the memory unit 1206 may be coupled to the processor unit 1202.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of various examples with their associated operations, any number of different examples is also within the scope of the aspects of the disclosure. Alternatively, or in addition to the implementations described herein, other implementations may be possible.

For example, in some implementations, the incumbent system may be a satellite system, a radar system, a terrestrial radio system, or a cellular communications system different from the WLAN. The incumbent system also may utilize at least the first portion of the first frequency band.

In some implementations, the first AP may determine a limit of APs that can utilize at least a first portion of a first frequency band in a geographical area by retrieving the limit from a configuration parameter of the first AP.

In some implementations, the first AP may determine the limit by calculating the limit based on historical measurements of interference for different quantities of APs utilizing the first portion of the first frequency band in the geographical area.

In some implementations, the limit may be a maximum limit of coexisting APs that are permitted to utilize the first portion of the first frequency band in the geographical area.

In some implementations, the first AP may determine a current amount of interference to the incumbent system caused by the quantity of existing APs in the geographical area. The first AP may determine that the current amount of interference exceeds a threshold interference level. The first AP may perform an interference mitigation technique in response to a determination that the current amount of interference exceeds the threshold interference level.

In some implementations, the first AP performing the interference mitigation technique may include the first AP rejecting a request from a first client device for a connection between the first client device and the first AP, preventing at least one existing client device from utilizing the first AP for a period of time, enabling a power control feature for at least one existing client device to reduce a first amount of interference caused by the first AP coverage area, causing at least one existing client device to utilize a different AP coverage area, reducing the WLAN density in the geographical area, or any combination thereof.

In some implementations, the first AP managing the configuration of the first AP may include the first AP managing a density of client devices associated with the first AP coverage area compared to a second AP coverage area of a second AP.

In some implementations, the first AP may determine the satellite coverage area for the satellite signal based on a current geographical position of the satellite. The first AP may determine the location of the first AP.

In some implementations, the first AP may obtain the current geographical position of the satellite from a satellite tracking server.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a first access point (AP) of a wireless local area network (WLAN), comprising:
   determining, by the first AP, a WLAN limit based on an estimated cumulative interference that a plurality of APs causes to a non-WLAN incumbent system when the plurality of APs and the non-WLAN incumbent system both utilize at least a same first portion of a first frequency band in a geographical area;
   determining, by the first AP, a current cumulative interference caused by the plurality of APs in the geographical area that utilize the first portion of the first frequency band; and
   managing, by the first AP, a configuration of the first AP based on the current cumulative interference and the WLAN limit to prevent the current cumulative interference from exceeding the WLAN limit.

2. The method of claim 1, further comprising:
   communicating a control message from the first AP to at least a second AP, wherein the control message includes at least one member selected from a group consisting of:
      the WLAN limit determined by the first AP;
      interference measurements regarding at least the first portion of the first frequency band;
      identification of existing APs in the geographical area; and
      the current cumulative interference determined by the first AP.

3. The method of claim 1, wherein managing the configuration of the first AP includes:
   determining that the current cumulative interference exceeds a cumulative interference limit of the non-WLAN incumbent system; and
   modifying the configuration of the first AP to reduce the current cumulative interference in response to a determination that the current cumulative interference exceeds the cumulative interference limit.

4. The method of claim 1, wherein managing the configuration of the first AP includes:
   modifying the configuration of the first AP to reduce the current cumulative interference in the geographical area in response to a determination that that the current cumulative interference exceeds the WLAN limit.

5. The method of claim 4, wherein modifying the configuration of the first AP includes at least one member selected from a group consisting of:
   refraining from establishing a first AP coverage area of the first AP in the first portion of the first frequency band;
   configuring the first AP coverage area to utilize a second portion of the first frequency band that is different from the first portion;
   performing a channel reselection to a new channel that is different from the first portion of the first frequency band and establishing the first AP coverage area using the new channel;
   configuring the first AP coverage area to utilize a second frequency band that is different from the first frequency band; and
   causing a second AP to modify a second AP coverage area of the second AP.

6. The method of claim 1, further comprising:
   receiving a request from a first client device for a connection between the first client device and the first AP;

updating the estimated cumulative interference to the non-WLAN incumbent system based, at least in part, on a projected additional interference that would result from granting the request; and determining whether to grant or reject the request based, at least in part, on whether the updated estimated cumulative interference to the non-WLAN incumbent system exceeds the WLAN limit.

7. The method of claim 1, wherein the first portion of the first frequency band includes a first channel defined within the first frequency band, and wherein the WLAN limit is determined as a maximum quantity of APs that can utilize the first channel in the geographical area.

8. A first access point (AP) of a wireless local area network (WLAN), comprising:
a processor configured to:
    determine a WLAN limit based on an estimated cumulative interference that a plurality of APs causes to a non-WLAN incumbent system when the plurality of APs and the non-WLAN incumbent system both utilize at least a same first portion of a first frequency band in a geographical area,
    determine a current cumulative interference caused by the plurality of APs in the geographical area that utilize the first portion of the first frequency band, and
    manage a configuration of an interface of the first AP based on the current cumulative interference and the WLAN limit to prevent the current cumulative interference from exceeding the WLAN limit; and
the interface configured to operate a coverage area of the WLAN based on the configuration.

9. The first AP of claim 8, wherein the instructions, when executed by the processor, cause the first AP to:
modify the configuration of the interface of the first AP to reduce the current cumulative interference in the geographical area in response to a determination that that the current cumulative interference exceeds the WLAN limit.

10. A computer-readable medium having stored therein instructions which, when executed by a processor of a first access point (AP) of a wireless local area network (WLAN), cause the first AP to:

determine a WLAN limit based on an estimated cumulative interference that a plurality of APs causes to a non-WLAN incumbent system when the plurality of APs and the non-WLAN incumbent system both utilize at least a same first portion of a first frequency band in a geographical area;

determine a current cumulative interference caused by the plurality of APs in the geographical area that utilize the first portion of the first frequency band; and manage a configuration of the first AP based on the current cumulative interference and the WLAN limit to prevent the current cumulative interference from exceeding the WLAN limit.

11. The computer-readable medium of claim 10, wherein the instructions, when executed by the processor, cause the first AP to:
modifying the configuration of the first AP to reduce the current cumulative interference in the geographical area in response to a determination that that the current cumulative interference exceeds the WLAN limit.

12. An apparatus, comprising:
means for determining, by the first AP, a WLAN limit based on an estimated cumulative interference that a plurality of APs causes to a non-WLAN incumbent system when the plurality of APs and the non-WLAN incumbent system both utilize at least a same first portion of a first frequency band in a geographical area;

means for determining, by the first AP, a current cumulative interference caused by the plurality of APs in the geographical area that utilize at least the first portion of the first frequency band; and means for managing, by the first AP, a configuration of the first AP based on the current cumulative interference and the WLAN limit to prevent the current cumulative interference from exceeding the WLAN limit.

13. The apparatus of claim 12, further comprising:
means for modifying the configuration of the first AP to reduce the current cumulative interference in response to a determination that that the current cumulative interference exceeds the WLAN limit.

\* \* \* \* \*